(No Model.)  3 Sheets—Sheet 1.

J. G. PHILPOT.
FERTILIZER DISTRIBUTER.

No. 261,627.  Patented July 25, 1882.

Witnesses:
Franck L. Ourand
L. L. Miller

Inventor:
John G. Philpot
per Chas. H. Fowler,
Attorney.

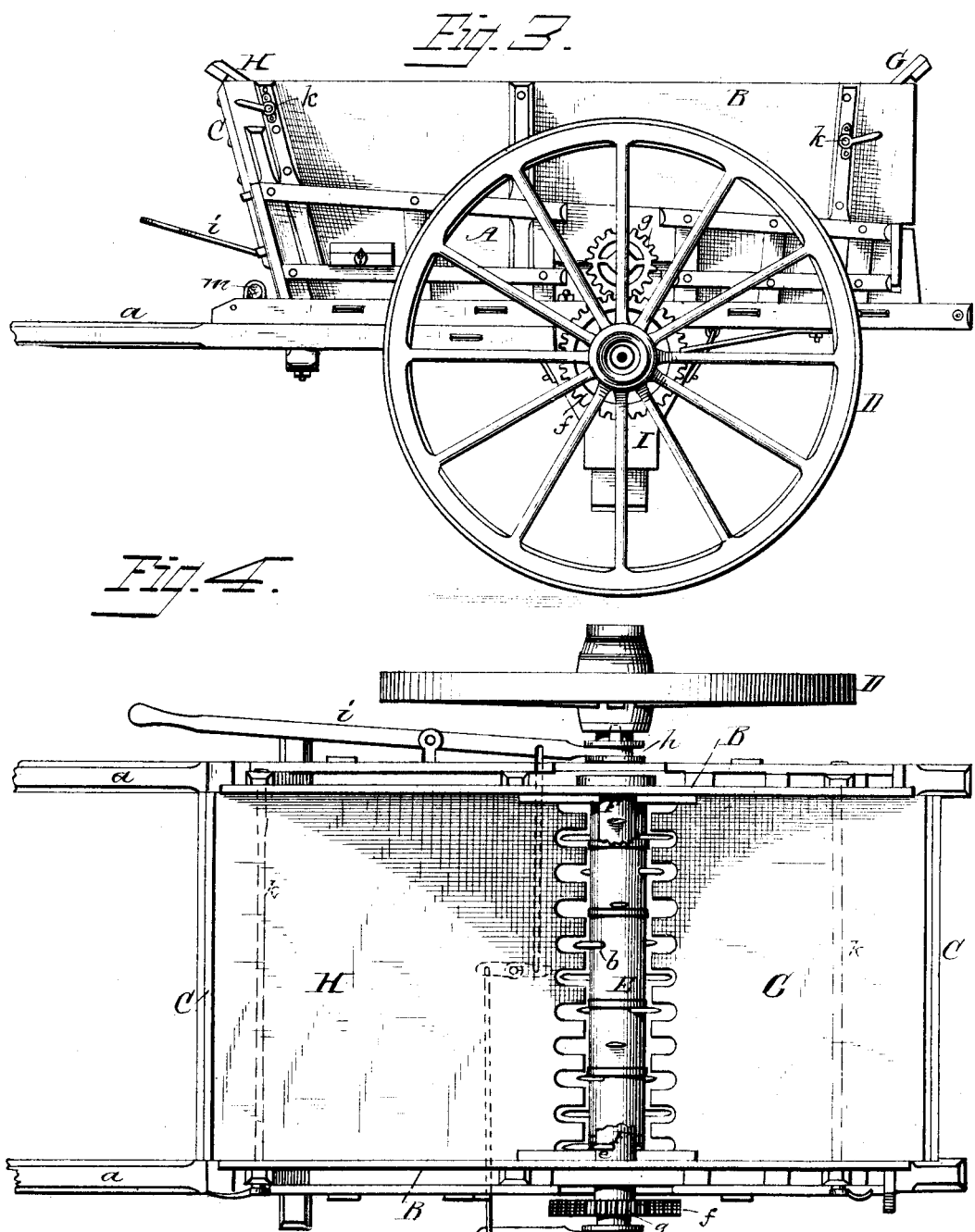

(No Model.) 3 Sheets—Sheet 3.
J. G. PHILPOT.
FERTILIZER DISTRIBUTER.
No. 261,627. Patented July 25, 1882.
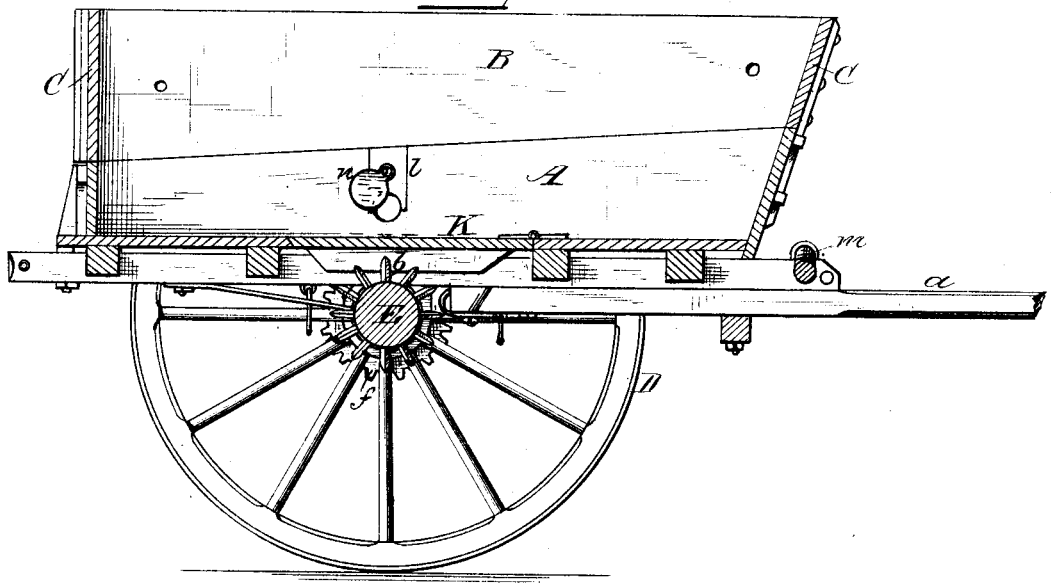
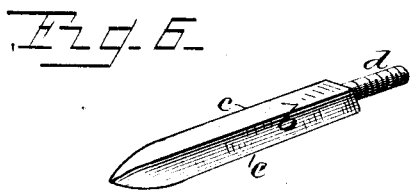
Witnesses
Franck L. Ourand,
L. L. Miller.
Inventor
John G. Philpot,
per Chas. H. Fowler
Attorney.

UNITED STATES PATENT OFFICE.

JOHN G. PHILPOT, OF LEBANON, TENNESSEE.

FERTILIZER-DISTRIBUTER.

SPECIFICATION forming part of Letters Patent No. 261,627, dated July 25, 1882.

Application filed June 20, 1882. (No model.)

*To all whom it may concern:*

Be it known that I, JOHN G. PHILPOT, a citizen of the United States, residing at Lebanon, in the county of Wilson and State of Tennessee, have invented certain new and useful Improvements in Fertilizer-Distributers; and I do hereby declare that the following is a full, clear, and exact description of the same, reference being had to the annexed drawings, making a part of this specification, and to the letters and figures of reference marked thereon.

Figure 1:
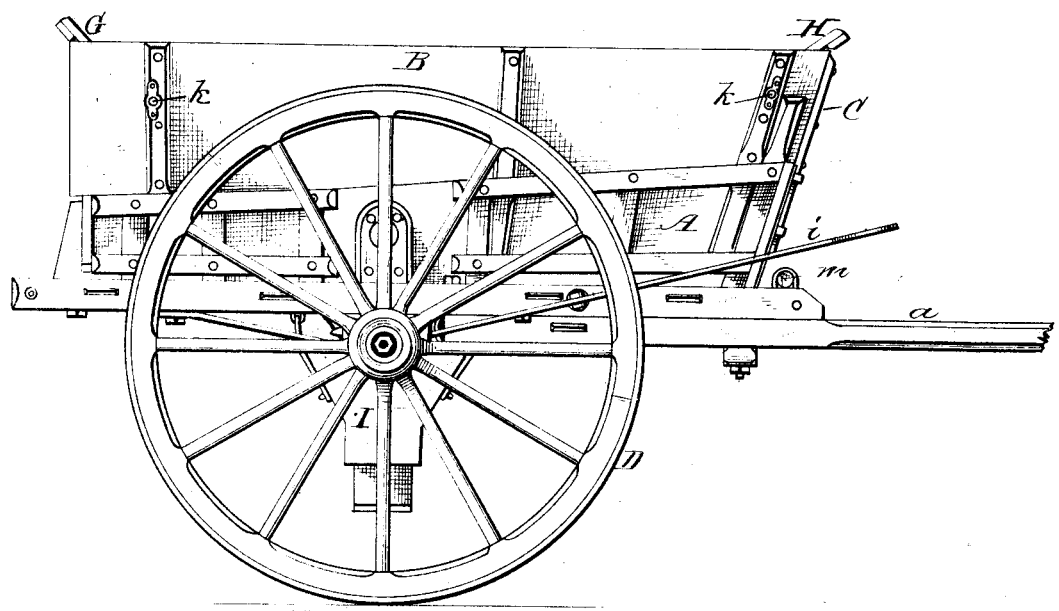
Figure 2:
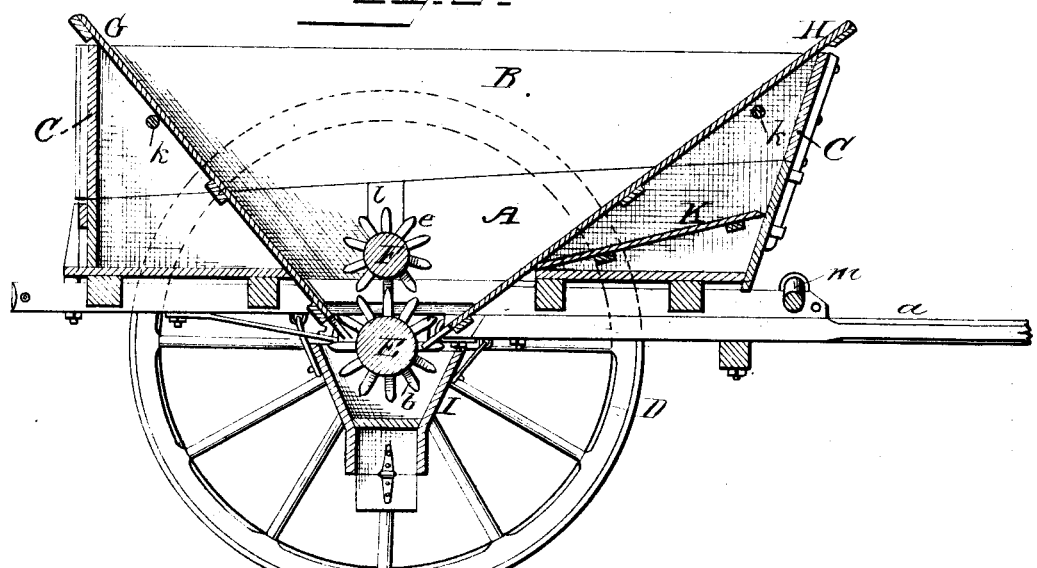

Figure 1 of the drawings is a side elevation of my invention; Fig. 2, a longitudinal vertical section thereof; Fig. 3, a side elevation reverse to that of Fig. 1; Fig. 4, a top plan view; Fig. 5, a sectional view of the invention when used as an ordinary farm-wagon; and Fig. 5 is a detail view, in perspective, of one of the double-edge cutting-knives.

The present invention has relation to certain new and useful improvements in that class of fertilizer-distributers wherein are employed adjustable and removable slotted hopper boards or gates, between which are arranged rotary agitators connected to a clutch mechanism for engaging or disengaging them with the hubs of the wheels.

The object of the invention is to provide such a machine that will perfectly and effectually cut up and distribute in broadcast or in drill at the same time barn-yard and all other fertilizers, and when the machine is not so required for use is readily converted into an ordinary farm-wagon. These objects I attain by the construction substantially as shown in the drawings and hereinafter described and claimed.

In the accompanying drawings, A represents the body of the wagon or fertilizer-distributer, as the case may be, to which are detachably and removably connected the side sections, B, and end sections, C.

To the body A are hinged suitable shafts, $a$, and the axle which supports the wheels D has rigidly connected to it the roller E, said roller having a series of spirally-arranged knives, $b$. The knives have double cutting-edges, as shown at $c$, Fig. 6, and a screw-shank, $d$, by which they are secured to the roller E, and readily removed when not required for use, as in case where fine fertilizer is used and no cutting necessary, the roller then acting simply as a spreader.

When the machine is used as above described the gates G H, hereinafter described, are reversed, with their upper or plain edges downward.

The double cutting-edges $c$ upon the knives $b$ admit of the knives being turned to bring one of the cutting-edges in position for use when the other cutting-edge becomes dull.

Directly above the roller E is a smaller roller, F, removably connected to the sides of the body A, and having double-edge cutting-knives $e$, similar in construction to the knives $b$ and arranged spirally around the periphery of said roller.

To one end of the roller E, outside the body A, is rigidly connected a gear-wheel, $f$, and to the end of the roller F a smaller gear-wheel, $g$, the teeth of said wheels meshing with each other, by which a rotary motion is imparted to the roller F, as hereinafter described.

That portion of the roller E projecting beyond the sides of the body A, I term the "axle," as it supports the wheels D, which are loosely mounted thereon, but are made to turn the roller by suitable clutches, $h$, which are brought in position by a lever, $i$, to lock the wheels to the axle.

Within the body A are arranged upon an incline the end gates, G H, which together, in connection with the sides of the body A, and sections B, form the hopper for containing the fertilizer. These gates G H at their lower edges are slotted in the ordinary manner to allow the knives $b$ of the roller E to pass when the roller is being rotated, also the discharge of the fertilizer into the drill-box I, in the usual manner. The lower ends of the gates G H extend below the bottom of the body A some little distance, and are both adjustable and removable from the body. The gates G H are securely held in the position placed by frictional contact of the sides B with the edges of the gates, said sides or sections B being drawn up tightly against the gates by clamping-rods $k$ of any suitable construction, which pass through the sections at each end of the body. The raising and lowering of the gates G H regulate the space between the lower edges thereof and periphery of the roller E to control the quantity of fertilizer to be discharged, the upper roller, F, with its knives, acting both as an agitator and cutter. The bottom of the body A has an opening on line with the rollers E F, into which project the lower ends of the gates G H, said opening being covered, when not in use, by a hinged door, K.

When the fertilizer-distributer is not required for use, and a wagon or cart required for hauling, the clamping-rods k are first loosened and withdrawn, and also the gates G H and drill-box I. One of the side sections B, is next removed to allow the removal of the slide l, after which the roller F can be removed and the hinged door closed down over the opening to form a closed bottom to the body A, and the side section replaced. The fertilizer-distributer is now converted into a farm-wagon or dumping-cart, as shown in Fig. 5. When used for hauling grain or other material the openings in the side of the body A are closed by pivoted plates n, to prevent the escape of the material. When only required for hauling stone or other like coarse material, or where any great depth of body is not deemed necessary, the side and end sections, B C, are removed and simply the body A used.

The wagon or cart can be dumped of its contents by removing the bar m, which connects it to the shafts or tongue.

Having now fully described my invention, what I claim as new, and desire to secure by Letters Patent, is—

1. In a fertilizer-distributer, the combination, with the roller F, provided with double-edge knives e, of the lower roller, E, having double-edge knives b, with screw-shanks d, said knives being detachably connected to said roller and reversible thereon, substantially as and for the purpose set forth.

2. In a fertilizer-distributer, the combination, with the removable roller F, having knives e, and the roller E, arranged below the body of the machine, and provided with removable double-edge cutting-knives b, of the adjustable and reversible gates G H, said gates being held in position by the clamping-rods k, substantially as and for the purpose set forth.

3. In a fertilizer-distributer, the combination, with the body A, having adjustable and removable gates G H and removable roller F, of the roller E, having removably connected thereto the reversible double-edge cutting-knives b, substantially as and for the purpose described.

4. In a fertilizer-distributer, the body A, provided with removable and adjustable gates G H, and removable roller F, in combination with the roller E, constructed as described, gear-wheels f g, and clutches h, substantially as and for the purpose specified.

5. In a fertilizer-distributer, the body A, provided with the removable roller F and removable gates G H and roller E and hinged door K, in combination with the side and end sections, B C, and rods k, substantially as and for the purpose set forth.

In testimony that I claim the above I have hereunto subscribed my name in the presence of two witnesses.

JOHN G. PHILPOT.

Witnesses:
F. L. OURAND,
H. C. HUNTEMANN.